US011059188B2

(12) United States Patent
Curhan et al.

(10) Patent No.: US 11,059,188 B2
(45) Date of Patent: Jul. 13, 2021

(54) FASTENERS WITH REDUCED BACTERIAL HARBORAGE POINTS, SEALING CAPABILITIES, AND COMPONENT PROTECTION FEATURES

(71) Applicant: Soft Robotics, Inc., Bedford, MA (US)

(72) Inventors: Jeffrey Curhan, Warwick, RI (US); Craig Demello, Newfields, NH (US); Thomas Womersley, Newton, MA (US); William Gunner, Quincy, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 78 days.

(21) Appl. No.: 16/189,753

(22) Filed: Nov. 13, 2018

(65) Prior Publication Data

US 2019/0145455 A1 May 16, 2019

Related U.S. Application Data

(60) Provisional application No. 62/584,399, filed on Nov. 10, 2017.

(51) Int. Cl.
*F16B 43/00* (2006.01)
*B25J 15/12* (2006.01)
(Continued)

(52) U.S. Cl.
CPC ............. *B25J 15/12* (2013.01); *B25J 9/142* (2013.01); *B25J 13/081* (2013.01); *B25J 13/089* (2013.01);
(Continued)

(58) Field of Classification Search
CPC ........ F16B 33/004; F16B 35/048; B25J 15/12
(Continued)

(56) References Cited

U.S. PATENT DOCUMENTS 2,995,057 A * 8/1961 Nenzelljoseph F .... F16J 15/108
411/399
3,343,864 A 9/1967 Baer
(Continued)

FOREIGN PATENT DOCUMENTS

CN 107002737 A 8/2017
DE 19827896 A1 12/1999
(Continued)

OTHER PUBLICATIONS

International Search Report and Written Opinion for the International Patent Application No. PCTIUS2018/060792, dated Mar. 30, 2019, 14 pages.
(Continued)

*Primary Examiner* — Gary W Estremsky
(74) *Attorney, Agent, or Firm* — Kacvinsky Daisak Bluni PLLC

(57) ABSTRACT

Exemplary embodiments relate to a fastener suitable for industrial tasks. Some embodiments include a sealing surface sized so that an outer surface of a sealing ring is located at approximately the same diameter as the fastener head, thus reducing ingress risk for foreign contaminants. Further embodiments provide a centering pilot to improve sealing consistency and quality. Some embodiments provide an angled flange on the fastener head to lift tightening tools away from the surface to which the fastener is being applied, and to shed liquids readily. The portion of the head that receives the tightening tools may be relatively small (approximately the same diameter as the fastener's threaded shaft) to reduce the risk of over-torquing. A bearing surface of the fastener may be located below the sealing ring (towards the threaded shaft) to prevent the fastener from marring the unsealed surface to which the fastener is being applied.

15 Claims, 10 Drawing Sheets

(51) Int. Cl.
*B25J 9/14* (2006.01)
*F16B 33/00* (2006.01)
*F16B 35/06* (2006.01)
*B25J 13/08* (2006.01)
*B25J 15/00* (2006.01)
*F16L 55/11* (2006.01)

(52) U.S. Cl.
CPC ......... *B25J 15/0023* (2013.01); *F16B 33/004* (2013.01); *F16B 35/06* (2013.01); *F16L 55/1108* (2013.01); *F16L 2201/40* (2013.01)

(58) Field of Classification Search
USPC .............................. 411/371.1, 402, 368, 369
See application file for complete search history.

(56) References Cited

U.S. PATENT DOCUMENTS

| | | | |
|---|---|---|---|
| 3,601,442 A | 8/1971 | Orndorff | |
| 3,640,564 A | 2/1972 | Kuster | |
| 3,803,972 A * | 4/1974 | Deutsher | F16B 33/004 411/337 |
| 3,981,528 A | 9/1976 | Andorf et al. | |
| 4,312,616 A * | 1/1982 | Waller | F16B 43/00 411/387.1 |
| 4,403,801 A | 9/1983 | Huff et al. | |
| 4,460,826 A | 7/1984 | Pryor | |
| 4,502,721 A | 3/1985 | Savin-Czeizler et al. | |
| 4,749,321 A * | 6/1988 | Knohl | F16B 37/14 411/369 |
| 4,875,818 A * | 10/1989 | Reinwall | F16B 33/004 411/369 |
| 5,006,026 A * | 4/1991 | Estrada | F16B 35/06 411/369 |
| 5,066,058 A | 11/1991 | Guyard | |
| 5,102,292 A | 4/1992 | Brinker et al. | |
| 5,201,625 A * | 4/1993 | Takenouchi | H01R 13/6215 411/369 |
| 5,228,867 A * | 7/1993 | Nagamine | H01R 13/6215 403/27 |
| 5,271,689 A * | 12/1993 | Ishii | H01R 13/6215 403/2 |
| 6,017,177 A * | 1/2000 | Lanham | F16B 23/003 411/402 |
| 6,046,177 A | 4/2000 | Stella et al. | |
| 6,244,807 B1 * | 6/2001 | Garcia | F16B 33/004 411/369 |
| 6,345,818 B1 | 2/2002 | Stephan et al. | |
| 6,789,989 B2 * | 9/2004 | Walther | F16B 35/06 411/186 |
| 9,048,572 B2 * | 6/2015 | Shibata | F16B 35/00 |
| 10,569,422 B2 | 2/2020 | Curhan et al. | |
| 10,578,145 B2 * | 3/2020 | Fujihara | F16B 43/001 |
| 2003/0094769 A1 * | 5/2003 | Tyroller | F16J 15/062 277/608 |
| 2006/0033350 A1 | 2/2006 | Besch | |
| 2010/0047033 A1 * | 2/2010 | Baumgartner | F16B 25/00 411/84 |
| 2010/0143074 A1 * | 6/2010 | Sumiya | F02F 7/006 411/411 |
| 2010/0217436 A1 | 8/2010 | Jones et al. | |
| 2013/0089388 A1 * | 4/2013 | Liu | F16B 35/06 411/371.2 |
| 2016/0075036 A1 | 3/2016 | Lessing et al. | |
| 2016/0114482 A1 | 4/2016 | Lessing et al. | |
| 2016/0131178 A1 * | 5/2016 | Shiba | F16B 43/00 411/368 |
| 2017/0173800 A1 | 6/2017 | Genefke | |
| 2017/0203443 A1 | 7/2017 | Lessing et al. | |
| 2017/0291806 A1 | 10/2017 | Lessing et al. | |
| 2017/0369149 A1 * | 12/2017 | Walker | B64C 3/26 |

FOREIGN PATENT DOCUMENTS

| | | |
|---|---|---|
| DE | 2009003471 U1 | 5/2009 |
| EP | 0534778 A2 | 3/1993 |
| EP | 2679838 A1 | 1/2014 |
| JP | H09109075 A | 4/1997 |
| JP | 2004181585 A | 7/2004 |
| WO | 2015191585 A1 | 12/2015 |

OTHER PUBLICATIONS

International Search Report and Written Opinion for the International Patent Application No. PCTIUS2018/060821, dated Mar. 19, 2019, 16 pages.

International Search Report and Written Opinion for International application No. PCT/US2018/055887, dated Jan. 30, 2019, 12 pages.

* cited by examiner

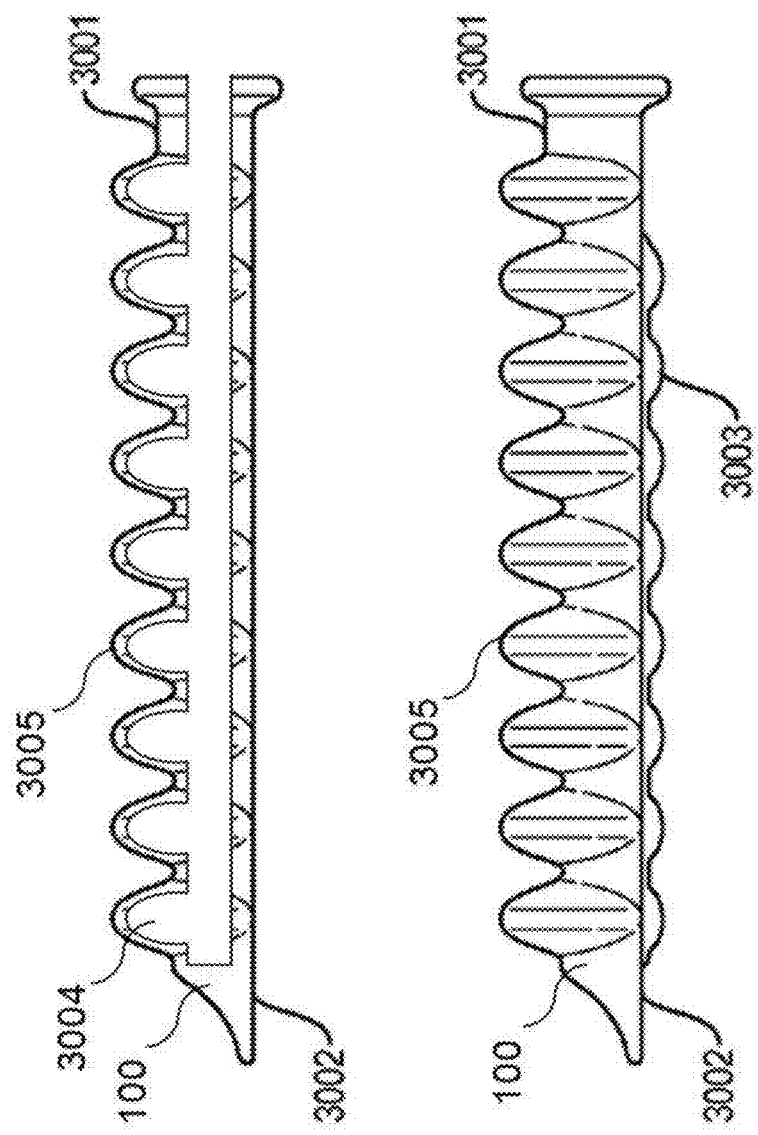

FASTENERS WITH REDUCED BACTERIAL HARBORAGE POINTS, SEALING CAPABILITIES, AND COMPONENT PROTECTION FEATURES

RELATED APPLICATIONS

This application claims priority to U.S. Provisional Patent Application Ser. No. 62/584,399, filed on Nov. 10, 2017. The contents of the aforementioned application are incorporated herein by reference.

FIELD OF THE DISCLOSURE

The disclosure relates generally to the field of fasteners, and especially fasteners suitable for use in industrial applications including robotic end-of-arm tools, pneumatic seals, and high-vibration environments.

BACKGROUND

Robotic systems are employed in a number of different contexts, and may be called upon to perform a wide variety of different tasks. Robots typically manipulate objects around them using robotic manipulators such as individual actuators, grippers, or end effectors.

Soft robotic actuators have recently been employed in contexts in which traditional hard actuators may be inappropriate or may suffer from deficiencies. For example, in food handling, it may be advantageous to use soft robotic actuators because of their improved ability to conform to the article being grasped, thus preventing the food from becoming marred or bruised. For similar reasons, soft actuators may be used in medical settings.

Whether a hard robotic actuator or a soft robotic actuator is employed, the handling of certain biological or chemical materials may pose unique problems. Hard and soft robotic systems may include numerous crevices, surface roughness, indentations, fasteners, and other areas where the biological or chemical materials may accumulate and breed bacteria or spread potentially poisonous matter to other products. Traditionally, it may be difficult to remove accumulated biological or chemical materials, thus creating a contamination hazard.

Contamination risks are present in other applications, as well. In many situations, the outer surface of an object may be exposed to chemical contaminants, biological sources, or hazardous materials. It is rare that the exposed surface will be perfectly uniform; typically, the surface includes a number of fasteners allowing the surface to be attached to other surfaces or objects. Foreign materials can work their way into the interstices between the fastener and the surface. Moreover, the fastener itself might have crevices (such as the slot on a screw head) that can harbor contaminants.

SUMMARY

Exemplary embodiments relate to a fastener having one or more features that improve the sealing capability of the fastener against foreign contaminants, reduce contaminant harborage points on the fastener or between the fastener and the surface to which the fastener is affixed, and improves tool-handling to reduce the risk that a tool will overtighten the fastener or mar a surface of the object to which the fastener is affixed.

In one embodiment, the fastener may be configured to be used in conjunction with a sealing ring having an outer diameter $od_{sealing\_ring}$. The fastener may include a head having a maximum diameter $d_{head}$, a threaded shaft, and a concave sealing surface. The concave sealing surface may be disposed between the head and the threaded shaft, and may be sized and shaped to receive the sealing ring and having a diameter $d_{sealing\_surface}$ less than the diameter $d_{head}$ by an amount sufficient to place the outer diameter $od_{sealing\_ring}$ of the sealing ring substantially at the diameter $d_{head}$ when the sealing ring is disposed in the sealing surface. With this configuration, the likelihood of a foreign contaminant intruding under the head of the fastener is reduced.

In some embodiments, the fastener may include a bearing surface configured to contact a surface of an object to which the fastener is being applied. The bearing surface may be disposed interior to the sealing surface (e.g., between the sealing surface and a bottom of the fastener, or inside the opening through which the fastener is inserted as compared to the sealing surface). With this configuration, the bearing surface that contacts the object is inside the sealed area maintained by the fastener, and so any marring that occurs on the surface of the object will be shielded against contaminants.

In some embodiments, the head of the fastener may include a flange. The flange may be angled to at least 45 degrees with respect to a radial direction of the fastener. With this configuration, liquids may run off the top of the fastener with relative ease, thus reducing the likelihood that a foreign contaminant will become stuck to the fastener, and allows the fastener to be washed down to eliminate any contaminants that are present.

In some embodiments, the flange have a length extending in a longitudinal direction of the fastener, and a length of the flange may be at least half of the total length of the head of the fastener. With this configuration a tool used to grip the top of the fastener is lifted away from the surface of the object to which the fastener is being applied, reducing the risk that the tool will contact and mar the surface of the object while tightening the fastener.

In some embodiments, the head may include a tool-receiving protrusion having a diameter. The flange may have a diameter that is larger than the diameter of the tool-receiving protrusion (for example, the diameter of the flange may be at least twice the diameter of the tool-receiving protrusion). With this configuration, the surface to which the object is being applied is further protected against contact from the tool because the flange shields the surface from the tool In some embodiments, the tool-receiving protrusion may lack recesses, such as an internal socket. This allows liquid to completely drain from the fastener and reduces contaminant harborage points.

In some embodiments, the tool-receiving protrusion may be relatively small in diameter compared to the maximum diameter of the fastener. For example, the tool-receiving protrusion may be substantially equal in diameter, or smaller in diameter, to the diameter of the threaded shaft. This configuration encourages or requires the use of a smaller tightening tool, which reduces the chance of over-torquing the fastener. This in turn improves the seal quality when a sealing element is applied and increases component thread life.

In some embodiments, the fastener may include a centering pilot disposed between the head and the threaded shaft. The centering pilot may guide the fastener into a consistently-centered position with respect to a threaded hole. This configuration serves to provide uniform radial compression of the sealing ring, and improves overall sealing quality. It also improves repeatability, allowing the fastener to be removed and re-installed without changing seal quality. Furthermore, it can be used to align a component to a threaded feature in an assembly, so that fastened components are positioned precisely as desired.

As noted above, the fastener may be used with or without a sealing ring. When used with a sealing ring, the sealing ring may be a discrete and separate element from the fastener, such that the sealing ring is removable and can be installed as needed. With this configuration, a damaged sealing ring can be easily replaced without needing to replace the fastener. Similarly, different types of sealing rings may be used with the same fastener, depending on the application or the material being sealed against.

Because each of the above-described features can provide advantages in isolation or in combination with other features, it is contemplated that any or all of these features may be used separately or in any combination with each other.

BRIEF DESCRIPTION OF THE DRAWINGS

FIGS. 1A-1G depict various examples of soft robotic actuators to which the exemplary fasteners may be applied.

DETAILED DESCRIPTION OF THE PREFERRED EMBODIMENTS

Figure 1A:
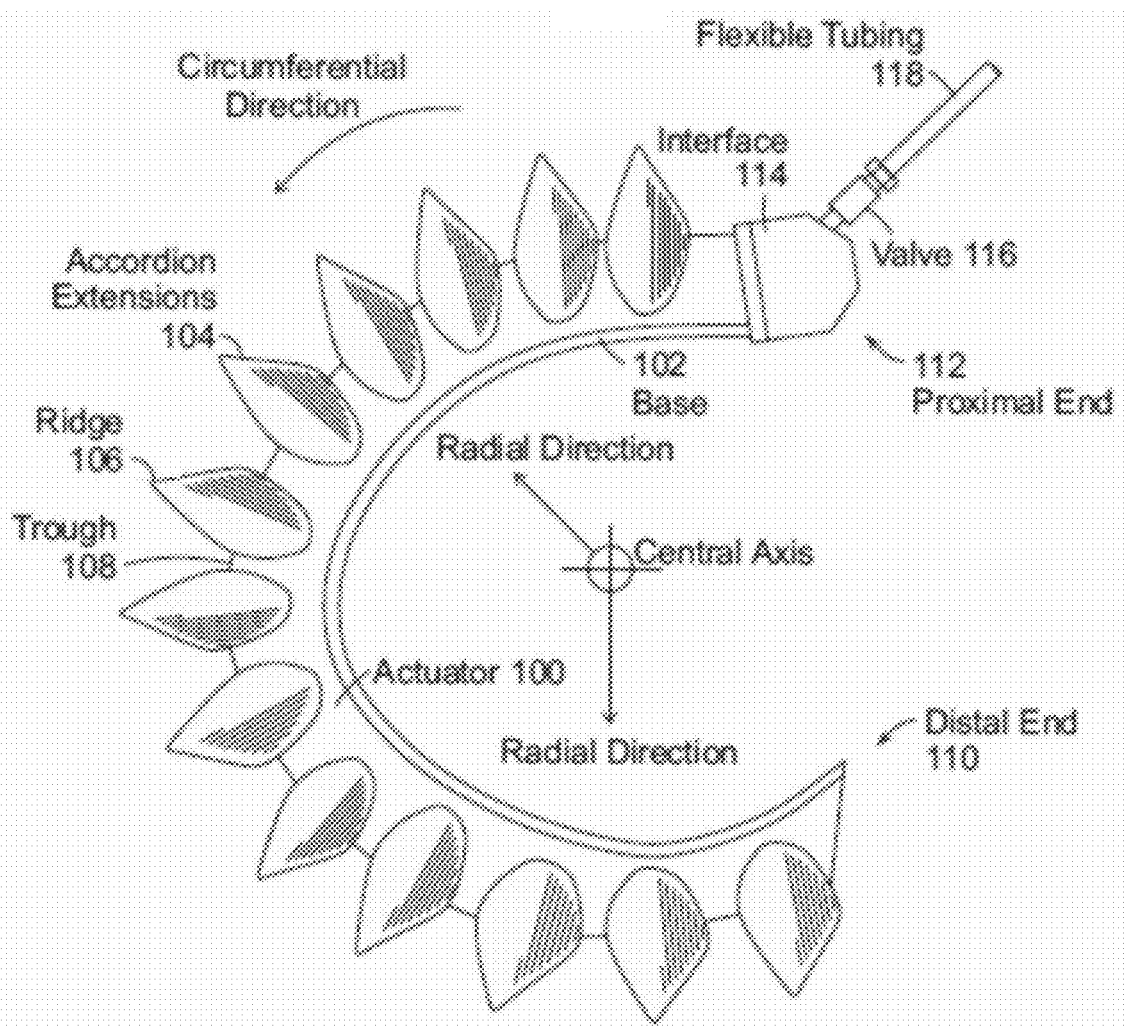

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
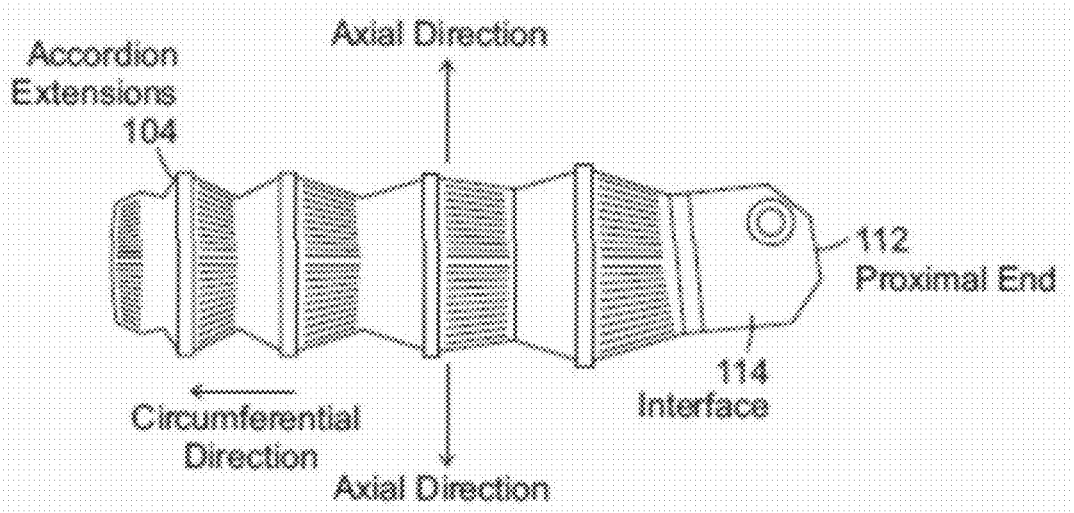
Figure 1C:
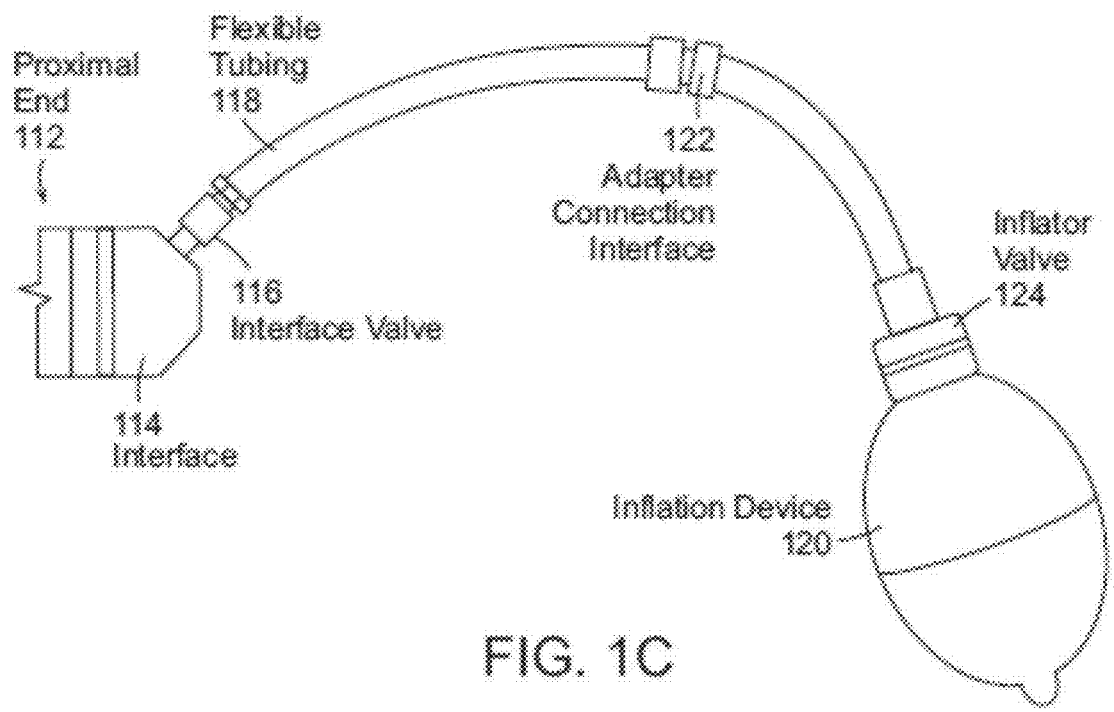
Figure 1D:
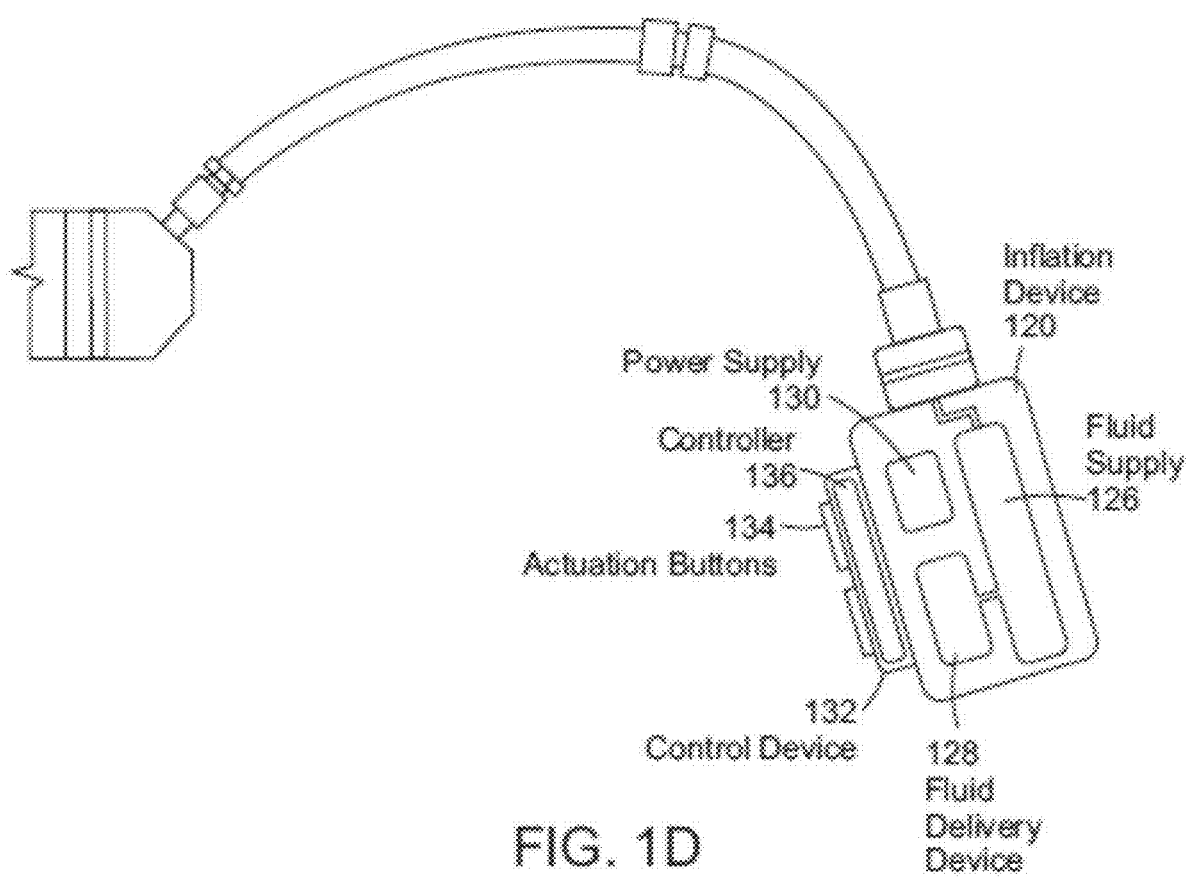

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118.

The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning form the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

Figure 1E:
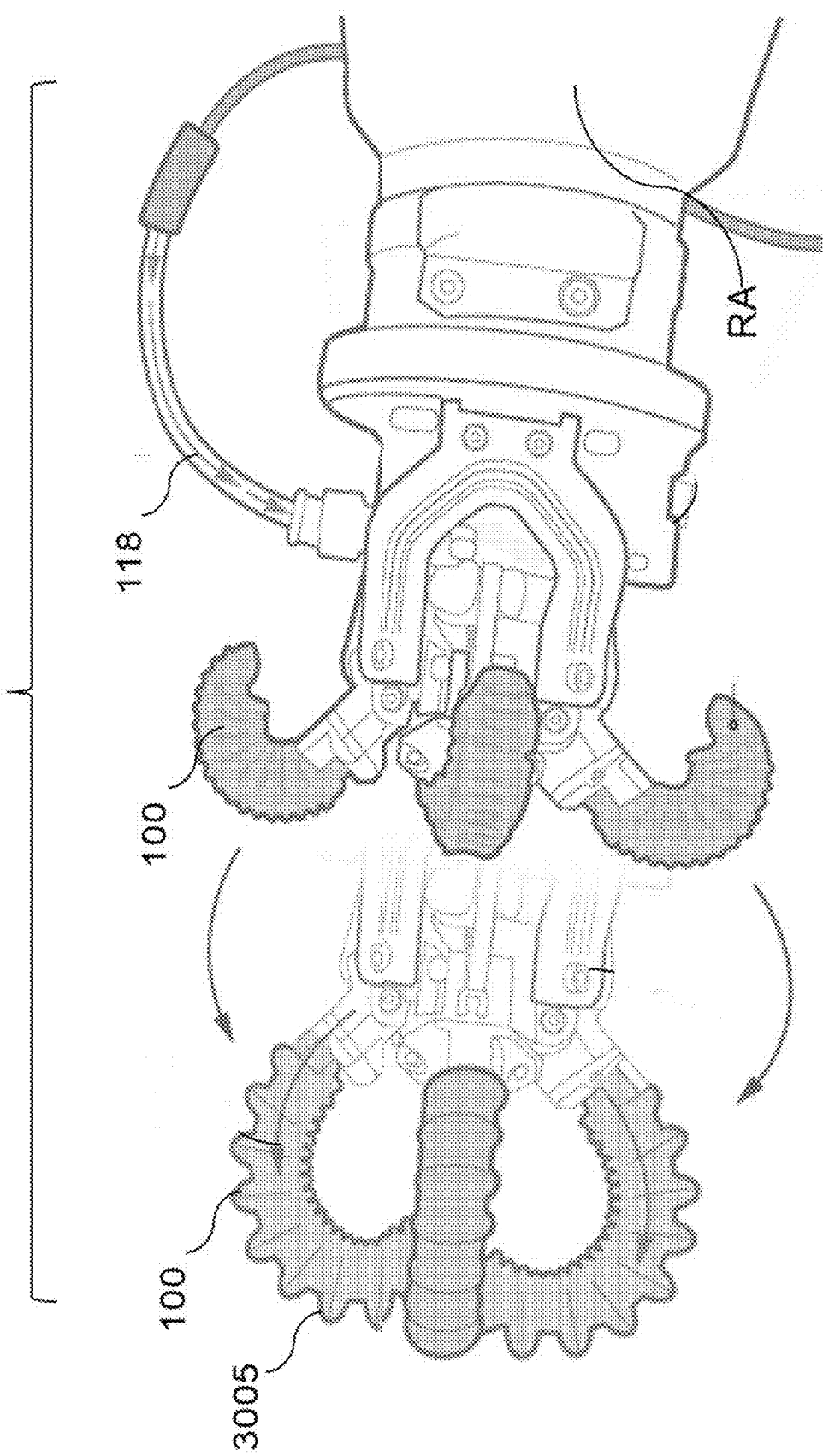

FIG. 1E depicts a soft robotic actuator 100 with multiple fingers, in which the gripper hub 202 is attached to a robot arm RA, in which the fluid supply for actuation is provided via an external fluid line 118. The fingers 100 are shown in a reverse curled position and curled in the direction 604.

FIGS. 1F and 1G depict a soft robotic actuator finger 100 that may be used with any embodiment discussed herein. Each finger 100 or actuator 100 includes an elastomeric outer surface 3005 surrounding an internal void 3004, and the is configured to curl when an inflation fluid is supplied to the internal void 3004. A strain-limiting side 2003 resists extension while the expanding side 3001 includes bellows features to promote extension as well as contraction upon a change in fluid pressure, either extension or contraction causing curling in one direction or another. Reinforcing ribs 3003 constrain expansion and contraction to occur primarily along the curling direction, and also provide some texture or ridges for grasping.

FIGS. 1A-1G depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially attractive or field forces such as Bernouilli lift, suction force, vacuum force, magnetic, electrostatic, van der Waals', ultrasonic standing waves, laser tweezing), and contigutive (e.g., essentially adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality. Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary Fasteners

The above described actuators and end effectors may be used in environments in which hazardous materials, foreign contaminants, or biological material is being handled. In these applications, it is important to reduce the risk that the material in question becomes stuck in crevices of the end effector For example, U.S. patent application Ser. Nos. 15/482,050 and 15/194,283 depict several embodiments in which soft robotic grippers are configured to handle food or hazardous material. In several of the examples depicted, fasteners are used to fasten various parts of the robotic EOAT or gripper hub.

Exemplary embodiments relate to fasteners suitable for use in applications such as these. However, the embodiments described herein are not limited to use in robotic end effectors. Rather, they may be useful in any situation in which a surface requires a fastener, but where it is desirable to seal the surface against a material, or to prevent the surface from being marred or damaged, or to reduce the available crevices into which material might be gathered.

Figure 2A:
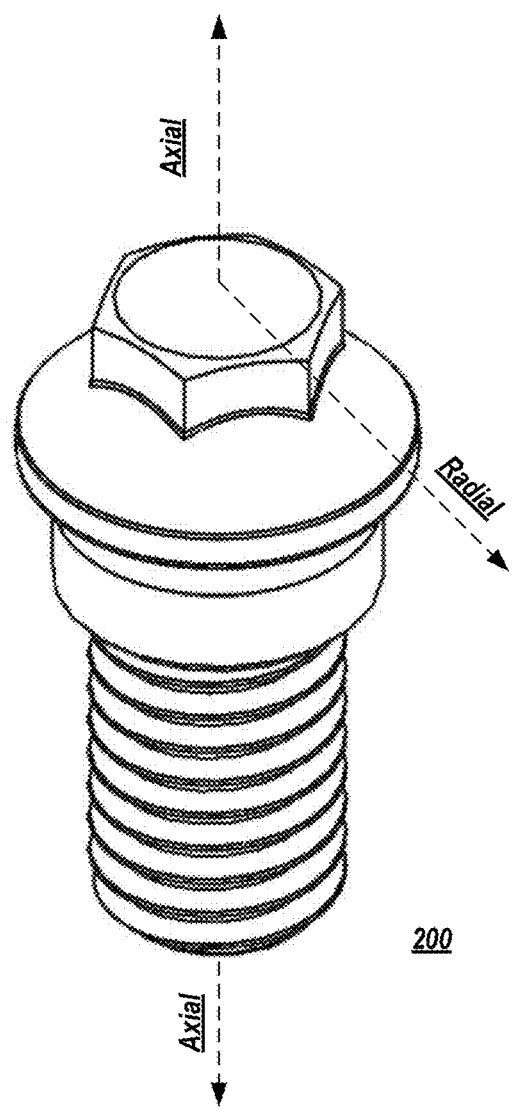
FIGS. 2A-2C depict an exemplary fastener in accordance with disclosed embodiments.
Figure 2B:
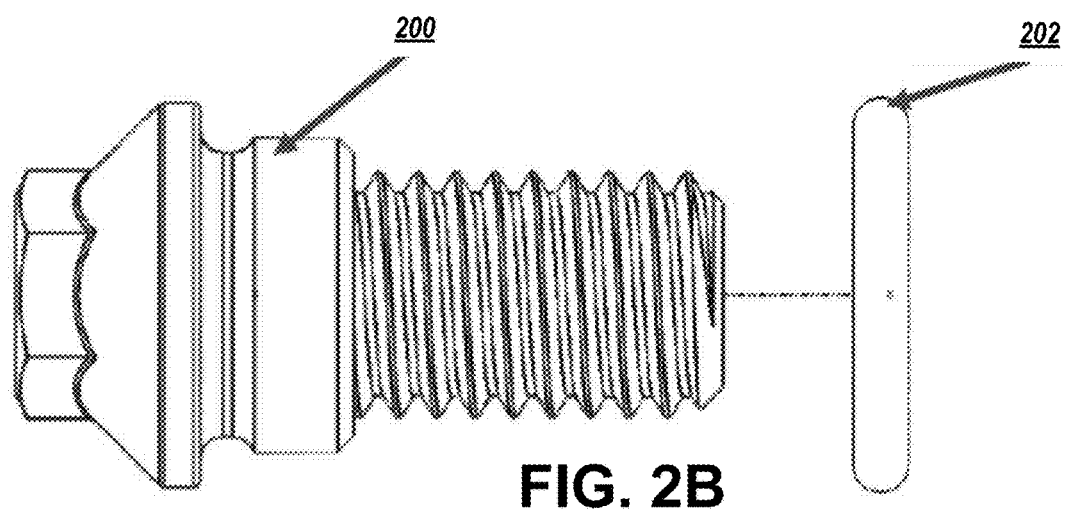
Figure 2C:
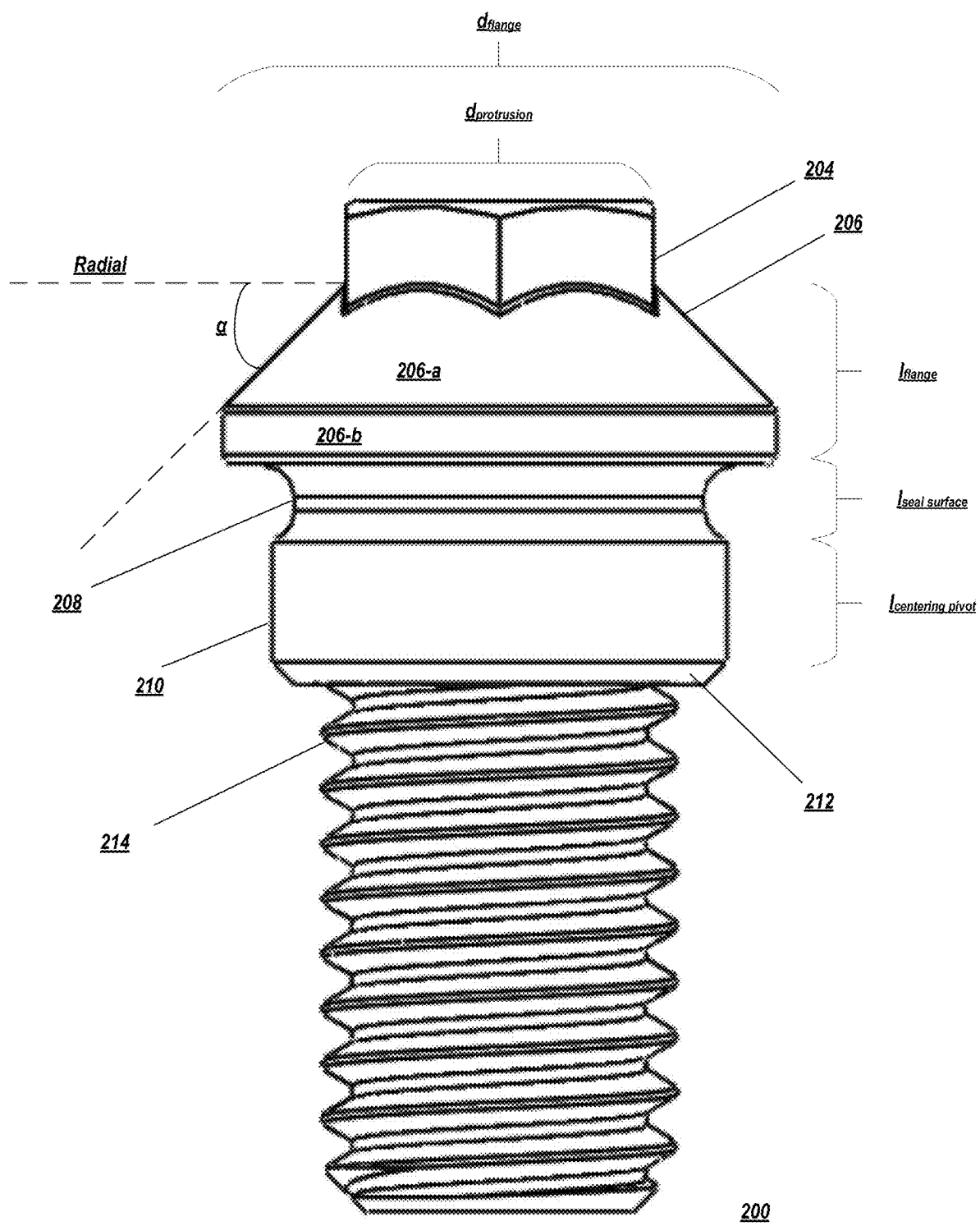

FIGS. 2A-2C depict various views of a fastener 200 and sealing ring 202 useful for sealing the opening into which the fastener is inserted against intrusion by foreign material.

The fastener 200 includes a number of features that improve its sealing, centering, installation, cleaning, and other capabilities. As shown in FIG. 2A, the fastener 200 extends in an axial or longitudinal direction from a top end to a bottom end and defines the length of various components of the fastener 200. A radial direction extends perpendicular to the axial direction and defines diameters of various components of the fastener 200.

The fastener 200 may optionally be used in conjunction with a sealing ring 202. As shown in FIG. 2B, the sealing ring 202 may be, for example, an o-ring formed of an elastomeric or compressible material. The sealing ring 202 may be made of rubber, plastic, neoprene, silicone, PTFE, polyurethane, or any other suitable material. The specific type of material used may depend on the application (e.g., the material that the sealing ring 202 is sealing against and the amount of compression needed to effect a seal), and different types of sealing rings 202 may be employed with a single fastener 200.

Figure 5:
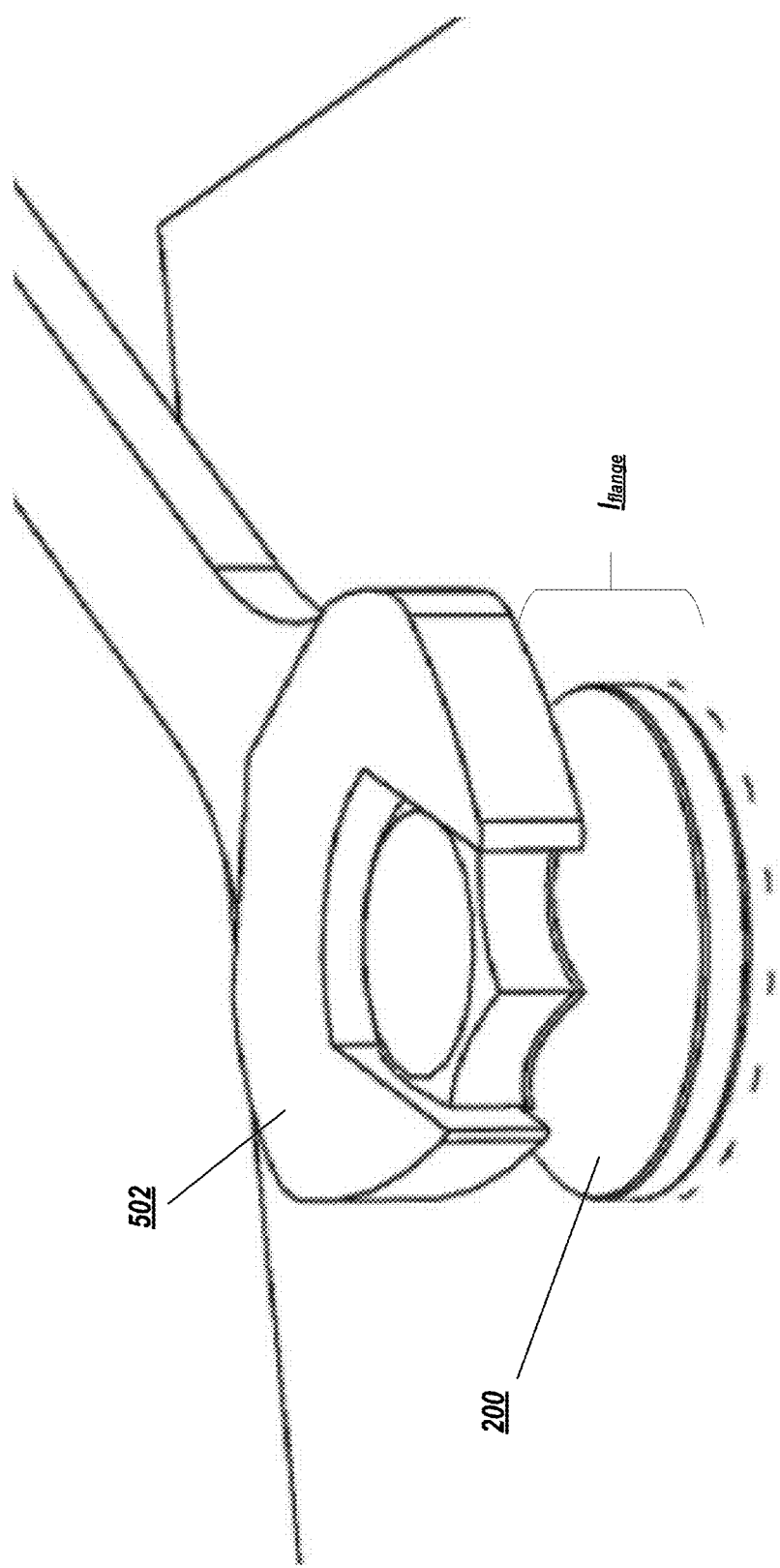
FIG. 5 depicts an exemplary installation or removal of an exemplary fastener.

Turning to FIG. 2C, the fastener 200 may include a tool-receiving protrusion 204 that accommodates a tool allowing for the fastener 200 to be tightened or loosened (see, e.g., FIG. 5). The shape of the tool-receiving protrusion 204 may depend on the type of tool used on the fastener; for instance, if it is desirable that the fastener 200 be installed and removed with a hex wrench, then the tool-receiving protrusion 204 may have a hexagonal shape.

Preferably, the tool-receiving protrusion 204 is an extension of the fastener 200 and does not include any recesses or crevices (as might be present, for instance, in a screw slot for a fastener configured to be installed with a flat-head or phillips-head screwdriver). Without such recesses or crevices, there are fewer points in which bacteria or other materials might be gathered. Moreover, without any internal sockets, the fastener 200 may be washed, where the lack of recesses provides for more complete liquid drainage.

The tool-receiving protrusion 204 may have a diameter $d_{protrusion}$. The diameter of the tool-receiving protrusion 204 may be relatively small compared to the maximum diameter of the fastener 200. For instance, the diameter of the tool-receiving protrusion 204 may be equal to or less than a diameter $d_{threading}$ of a threaded shaft 214 of the fastener (as measured at the maximum extent or diameter of the threading). Providing a relatively low-diameter tool-receiving protrusion 204 encourages the use of a smaller tool to tighten the fastener 200, which reduces the risk that the fastener will be over-torqued. Depending on the sealing ring 202 employed, over-torquing the fastener 200 may degrade the quality of the seal or reduce the lifespan of the sealing ring 202. Moreover, over-torquing the fastener 200 may increase the thread life of the fastener 200 and/or the threaded hole into which the fastener 200 is inserted.

Below the tool-receiving protrusion 204 (in the longitudinal direction, where the tool-receiving portion 204 is at the top of the fastener 200 and the bottom of the threading 214 is at the bottom of the fastener 200), a flange 206 may be provided. The flange may be an extension such that the diameter of the flange 206 ($d_{flange}$) is wider than the diameter $d_{protrusion}$ of the tool-receiving protrusion 204. For example, the diameter of the flange 206 may be at least twice the diameter of the tool-receiving protrusion 204. Because the diameter of the flange 206 is wider than the diameter of the tool-receiving protrusion 204, the surface under the fastener 200 is protected against the tool being used to tighten or loosen the fastener 200. The flange 206 serves as a shield against the tool (see FIG. 5) so that the surface of the object to which the fastener is applied does not become marred or otherwise damaged.

The flange 206 may include an angled flange body 206-$a$ and/or a non-angled flange body 206-$b$. If the angled flange body 206-$a$ is employed, the outer surface of the angled flange body 206-$a$ may extend at an angle $\alpha$ with respect to the radial direction of the fastener 200. The angle $\alpha$ may be any suitable angle such that liquids or other materials may be shed from the fastener (allowing the fastener to shed contaminating liquids, and allowing the fastener to be washed without retaining small pools of water). For instance, the angle $\alpha$ may be at least 30 degrees or, more preferably, at least 45 degrees.

The flange 206 and the tool-receiving protrusion 204 may collectively form a head of the fastener 200. The head of the fastener may have a length in the longitudinal direction. Preferably, the length of the flange 206 makes up at least half of the length of the fastener head. As shown in FIG. 5, by providing a relatively tall flange 206, any tool 502 used to tighten the fastener 200 using the tool-receiving protrusion 204 will be lifted away from the surface of the object to which the fastener is being installed by at least the length of the flange $l_{flange}$. As a result, there is a reduced likelihood that the tool 502 will make contact with the surface of the object, which could cause the surface to become damaged or marred. If the surface is exposed to a corrosive material, damage to the surface may reduce its lifespan. Moreover, nicks or other marks in the surface may provide additional bacterial harborage points, or points at which other foreign contaminants can gather.

Returning to FIG. 2C, a concave sealing surface 208 may be provided below the flange 206. The concave sealing surface 208 may be sized and shaped to receive a sealing ring 202. The concave sealing surface 208 may have a diameter $d_{sealing\_surface}$ measured from innermost point on concave surface. Preferably, the diameter $d_{sealing\_surface}$ is defined with respect to the diameter of the widest portion of the fastener 200 (which, in this example, is the flange 206) so that the outer surface of a sealing ring deployed on the sealing surface 208 extends substantially to the diameter of the widest portion of the fastener.

This feature reduces the crevices or other ingress sources exposed to contaminants when the fastener 200 is installed. For example, FIG. 3A shows a typical bolt having a head 302 and a threaded shaft 304. In this case, a sealing ring may be inserted over the threaded shaft 304. The inner diameter of the sealing ring must therefore be selected to accommodate the threaded shaft 304, but because sealing rings are typically relatively narrow in cross-sectional diameter, the sealing ring is unlikely to extend the full diameter of the head 302 of the fastener. In fact, the sealing ring's outer diameter is likely to be closer to the diameter of the threading than that of the head.

As a result, crevices 308 are created that allow ingress by contaminants. If biological material becomes trapped in the crevices 308, it may cause bacteria to develop.

Figure 3B:
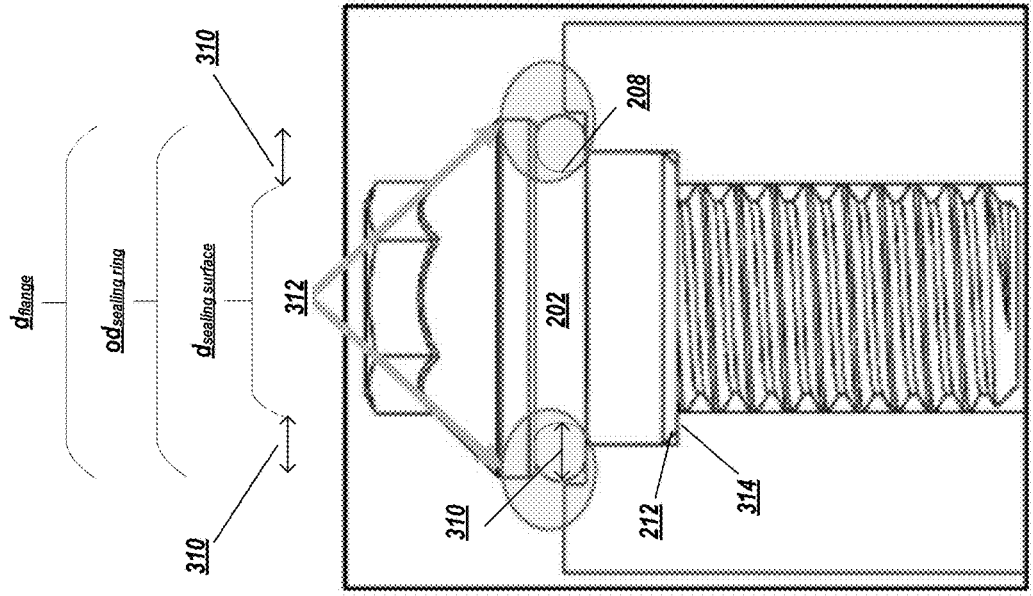
FIGS. 3A-3B depict various advantages of the exemplary fastener.
Figure 3A:
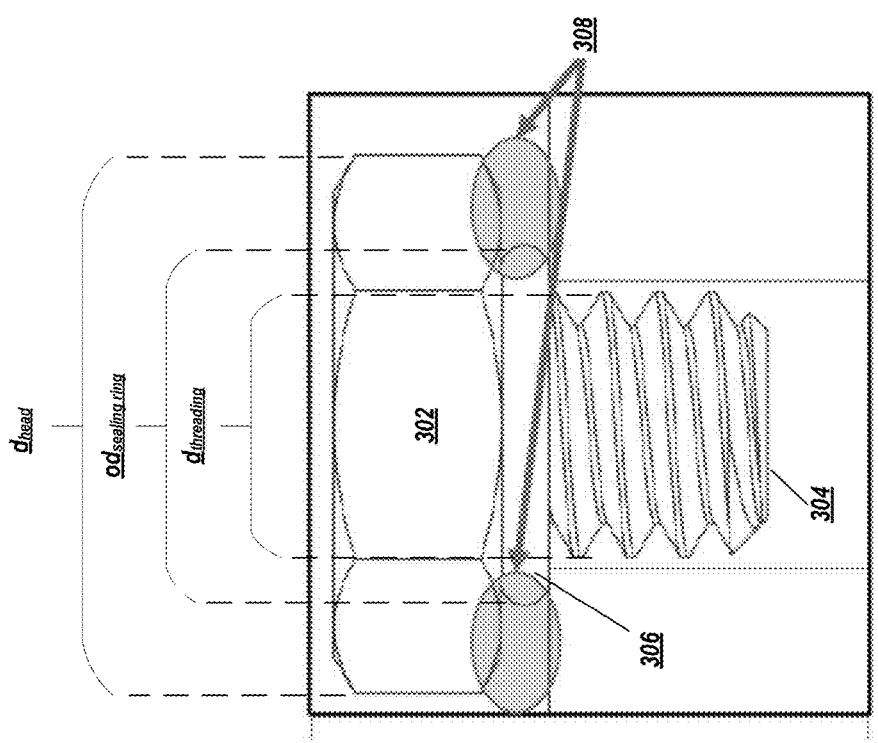

In contrast, FIG. 3B depicts a fastener having a sealing surface 208 configured according to the present disclosure. The concave sealing surface 208 is sized and configured so that, when a sealing ring having a cross-sectional diameter 310 is fitted over the sealing surface 208, an outer diameter of the sealing ring ($od_{sealing\_ring}$) is substantially the same as the diameter of the flange 206. Accordingly, the size of the crevices 312 is greatly reduced. This may be accomplished by defining the diameter of the sealing surface 208 ($d_{sealing\_surface}$) to correspond to the diameter of the flange 206 ($d_{flange}$) minus double the cross-sectional diameter 310 of the sealing ring 202. The cross-sectional diameter of the sealing ring 202 may depend on the application in which the sealing ring 202 is employed and thus may vary for different sealing rings 202; nonetheless, the range of cross-sectional diameters of the sealing ring will typically be fairly narrow relative to the size of the fastener 200.

Figure 4:
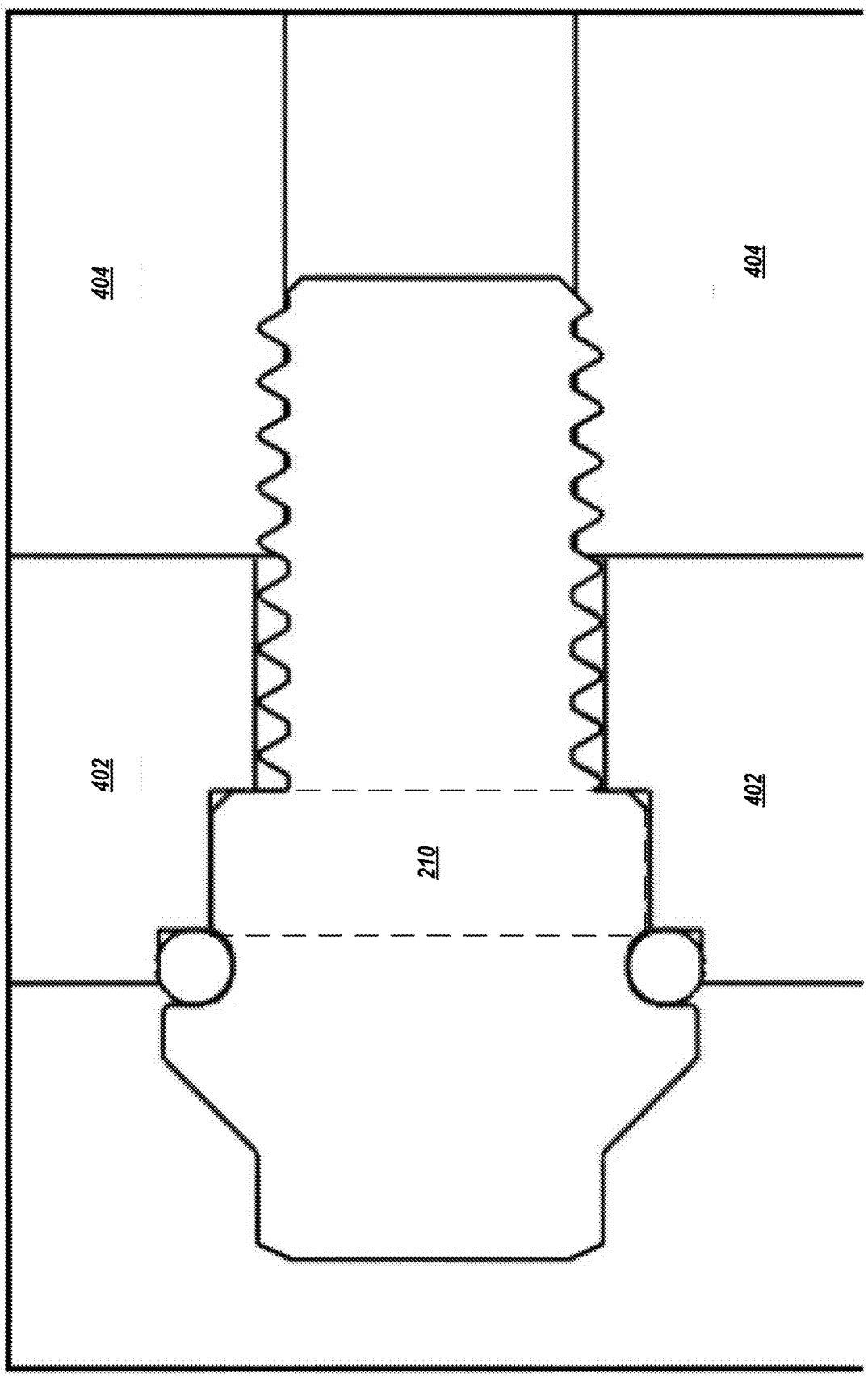
FIG. 4 depicts a use of an exemplary centering pilot on an exemplary fastener.

The size of the crevices 312 may also be reduced by inserting the fastener 200 into a stepped surface, such as the one shown in FIGS. 3B and 4. A custom assembly (as described in more detail below) may be used for this purpose.

As used herein, the term "extends substantially to the diameter of the widest portion of the fastener" means that the outer surface of the sealing ring extends to, or nearly to, the diameter of the widest portion of the fastener 200 to accomplish the goal of reducing contaminant or bacterial harborage below an acceptable threshold. The threshold may depend on the application; for example, if the surface being fastened is intended for use with a particularly deadly chemical such that no residual amount of the chemical can be tolerated, then the outer surface of the sealing ring may be flush with the surface and the flange 206 (when in a fastened state, which may compress the sealing ring somewhat). Typically, however, some small amount of contaminant or bacterial harborage may be tolerated. This may be defined based on the size of the crevices that are permissible, or may be defined based on an amount of tolerable bacteria that may be permitted to accumulate. For instance, if bacteria or another contaminant is determined to be safe or permissible below a certain threshold, then the sealing ring 202 need not be perfectly flush with the surface and the flange 206; the sealing ring 202 may permit small crevices as long as the total area exposed in the crevices would not permit more than the threshold amount of bacteria or contaminant to accumulate.

Below the sealing surface 208, the fastener 200 may include a centering pilot 210, which represents a portion of the fastener 200 having a diameter greater than that of the threaded shaft 214 (but preferably not as large as the outer diameter of the sealing element, which could create crevices or openings into which foreign contaminants might be admitted) Also the centering pilot 210 is preferably sized to allow the sealing ring to pass over the centering pilot 210 to be seated on the sealing surface.

With conventional fasteners, the fastener may be inserted into a threaded hole at an angle or may be overtightened. Inserting the fastener at an angle means that different portions of the head of the fastener will compress the sealing ring to different degrees, thus resulting in an uneven seal and low seal quality. Overtightening the fastener may overly compress the sealing element, and may cause excessive wear on the threaded shaft or threaded hole.

In exemplary embodiments, as shown in FIG. 4, the centering pilot 210 is sized and shaped to fit into a recess in a hole configured to receive the fastener. Preferably, the hole is stepped, with a step configured to receive the centering pilot 210. For this purpose, an assembly 402 may be provided, which is fitted on top of a surface 404 that has a threaded hole. The assembly 402 may be partially threaded. When the fastener 200 is inserted in to the assembly 402 and tightened, the presence of a corresponding step for the centering pilot 210 ensures that the fastener 200 is installed centered and straight. Furthermore, the lower surface of the centering pilot 210 provides a hard stop against the step in the assembly 202, which prevents the fastener 200 from being overtightened.

Further preferably, the assembly 402 may include a second step configured to receive the sealing element 202. The height and width of the step may correspond to half the cross-sectional diameter of the sealing element 202, which allows the sealing element to seat properly in the sealing surface 208 and further presents minimal crevices to the external environment.

The centering pilot 210 may also be used to align two components. For instance, if the surface 204 and the assembly 202 represent two pieces that are being fastened together, the centering pilot 210 may fit into the step in the assembly 202 and therefore allow the assembly 202 and the surface 204 to be aligned in a predetermined configuration.

Returning to FIG. 2C, a bearing surface 212 may be provided on the bottom of the centering pilot 210 (or more generally, on an internal part of the screw, where "internal" means lower in the longitudinal direction than the sealing surface 208 so that, when a sealing element seals the fastener against the external environment, the bearing surface 212 is present on the inside portion that is sealed).

A bearing surface 212 generally describes the part of a fastener that makes contact with the surface to which the fastener is applied. For example, in a conventional bolt, the internal side of the bolt's hex head contacts the surface against which the bolt is tightened.

If the bearing surface 212 is provided outside the seal created by the sealing ring 202, the bearing surface 212 can scrape, and therefore mar or otherwise damage, the unsealed surface. If the surface is exposed to corrosive agents or other foreign contaminants, the surface may become damaged in this area or may begin to harbor bacteria. By providing the bearing surface 212 internal to the sealing ring 202, the bearing surface 212 makes contact with a portion 314 of the surface to which the fastener is applied that is sealed against contaminants. This reduces the risk of foreign material intrusion and protects against corrosion and other problems.

Exemplary Method

Figure 6:
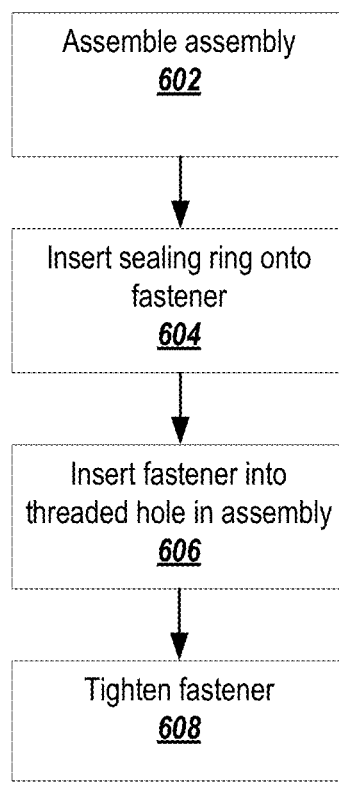
FIG. 6 is a flowchart describing an exemplary method for using a fastener in accordance with exemplary embodiments.

FIG. 6 describes a procedure for deploying and using a fastener as described above.

At block 602, an assembly (such as the assembly 402 of FIG. 4) may optionally be provided and put into place over a threaded hole in a surface to which the fastener may be inserted.

At block 604, a sealing ring may be inserted over the threaded shaft of the fastener. The sealing ring may be selected based on the particular application. The sealing ring may be seated into a sealing surface of the fastener.

At block 606, the fastener may be inserted into a hole (which may be unthreaded, partially threaded, or fully threaded) in the assembly.

At block 608, the fastener may be tightened. As the fastener is tightened, the threaded shaft of the fastener may pass through the assembly and into the surface to be fastened. When the centering pilot reaches the step in the assembly, the fastener may be fully tightened and may not permit further tightening.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including EOAT 202 and the like. Bendable members may include soft robotic members such as soft robotic actuators 100.

We claim:

1. A fastener configured to be used in conjunction with a sealing ring having an outer diameter $od_{sealing\_ring}$, the fastener comprising:
    a head having a maximum diameter $d_{head}$;
    a flange on the head, the flange angled to between 30 and 45 degrees with respect to a radial direction of the fastener;
    a threaded shaft;
    a concave sealing surface disposed between the head and the threaded shaft, the concave sealing surface sized and shaped to receive the sealing ring and having a diameter $d_{sealing\_surface}$ less than the diameter $d_{head}$ by an amount sufficient to place the outer diameter $od_{sealing\_ring}$ of the sealing ring substantially at the diameter $d_{head}$ when the sealing ring is disposed in the sealing surface;
    an unthreaded centering pilot disposed between the head and the threaded shaft and having a diameter greater than a diameter of the threaded shaft, wherein the centering pilot is sized and shaped to guide the fastener into a consistently-centered position with respect to a threaded hole; and
    a bearing surface disposed between the centering pilot and the threaded shaft, the bearing surface configured to contact a surface of an object to which the fastener is being applied in an axial direction of the fastener, wherein the bearing surface is disposed interior to the sealing surface.

2. The fastener of claim 1, wherein the flange extends in a longitudinal direction of the fastener, wherein a length of the flange in the longitudinal direction is at least half of a length of the head of the fastener.

3. The fastener of claim 1, wherein the head comprises a tool-receiving protrusion having a diameter, and wherein the flange has a diameter that is larger than the diameter of the tool-receiving protrusion.

4. The fastener of claim 3, wherein the diameter of the flange is at least twice the diameter of the tool-receiving protrusion.

5. The fastener of claim 1, wherein the head comprises a tool-receiving protrusion, and the tool-receiving protrusion is devoid of an internal socket.

6. The fastener of claim 5, wherein the tool-receiving protrusion has a diameter that is substantially equal to a diameter of the threaded shaft.

7. An assembly comprising the fastener of claim 1 and the sealing ring, wherein the sealing ring is a discrete element from the fastener.

8. A fastener extending in a longitudinal direction from a top end to a bottom end, the fastener comprising:
    a head disposed at the top end of the fastener, the head having a tool-receiving protrusion provided at a topmost end and a flange disposed below the tool-receiving protrusion, the flange having a diameter at least twice as large as the tool-receiving protrusion, wherein the flange has a length in the longitudinal direction that is at least half the length of the head; and a threaded shaft disposed at the bottom end of the fastener;

an unthreaded centering pilot disposed between the head and the threaded shaft and having a diameter greater than a diameter of the threaded shaft, wherein the centering pilot is sized and shaped to guide the fastener into a consistently-centered position with respect to a threaded hole; and a bearing surface disposed between the centering pilot and the threaded shaft, the bearing surface configured to contact a surface of an object to which the fastener is being applied in the longitudinal direction of the fastener.

9. The fastener of claim 8, wherein the flange is angled to between 30 and 45 degrees with respect to a radial direction of the fastener.

10. The fastener of claim 8, wherein the tool-receiving protrusion is devoid of an internal socket.

11. The fastener of claim 8, wherein the tool-receiving protrusion has a diameter that is substantially equal to a diameter of the threaded shaft.

12. An assembly comprising the fastener of claim 8 and the sealing ring, wherein the sealing ring is a discrete element from the fastener.

13. A fastener extending in a longitudinal direction from a top end to a bottom end, the fastener comprising:

a head disposed at the top end of the fastener, the head having a tool-receiving protrusion provided at a topmost end and a flange disposed below the tool-receiving protrusion, the flange having a diameter at least twice as large as the tool-receiving protrusion; and a threaded shaft disposed at the bottom end of the fastener;

an unthreaded centering pilot disposed between the head and the threaded shaft and having a diameter greater than a diameter of the threaded shaft, wherein the centering pilot is sized and shaped to guide the fastener into a consistently-centered position with respect to a threaded hole;

a bearing surface disposed between the centering pilot and the threaded shaft, the bearing surface configured to contact a surface of an object to which the fastener is being applied in the longitudinal direction of the fastener; and a concave sealing surface disposed between the flange and the threaded shaft.

14. The fastener of claim 13, the concave sealing surface sized and shaped to receive a sealing ring and having a diameter $d_{sealing\_surface}$ less than a diameter of the head $d_{head}$ by an amount sufficient to place an outer diameter $od_{sealing\_ring}$ of the sealing ring substantially at the diameter $d_{head}$ when the sealing ring is disposed in the sealing surface.

15. The fastener of claim 13, wherein the bearing surface is disposed interior to the sealing surface.

* * * * *